Dec. 6, 1966　　　　O. E. WOLFF　　　　3,289,559
CAMERA INDEXING MECHANISM

Filed Nov. 5, 1964　　　　　　　　　　　　4 Sheets-Sheet 1

INVENTOR.
Otto E. Wolff
BY Brown and Mikulka
and
Robert E. Corb
ATTORNEYS

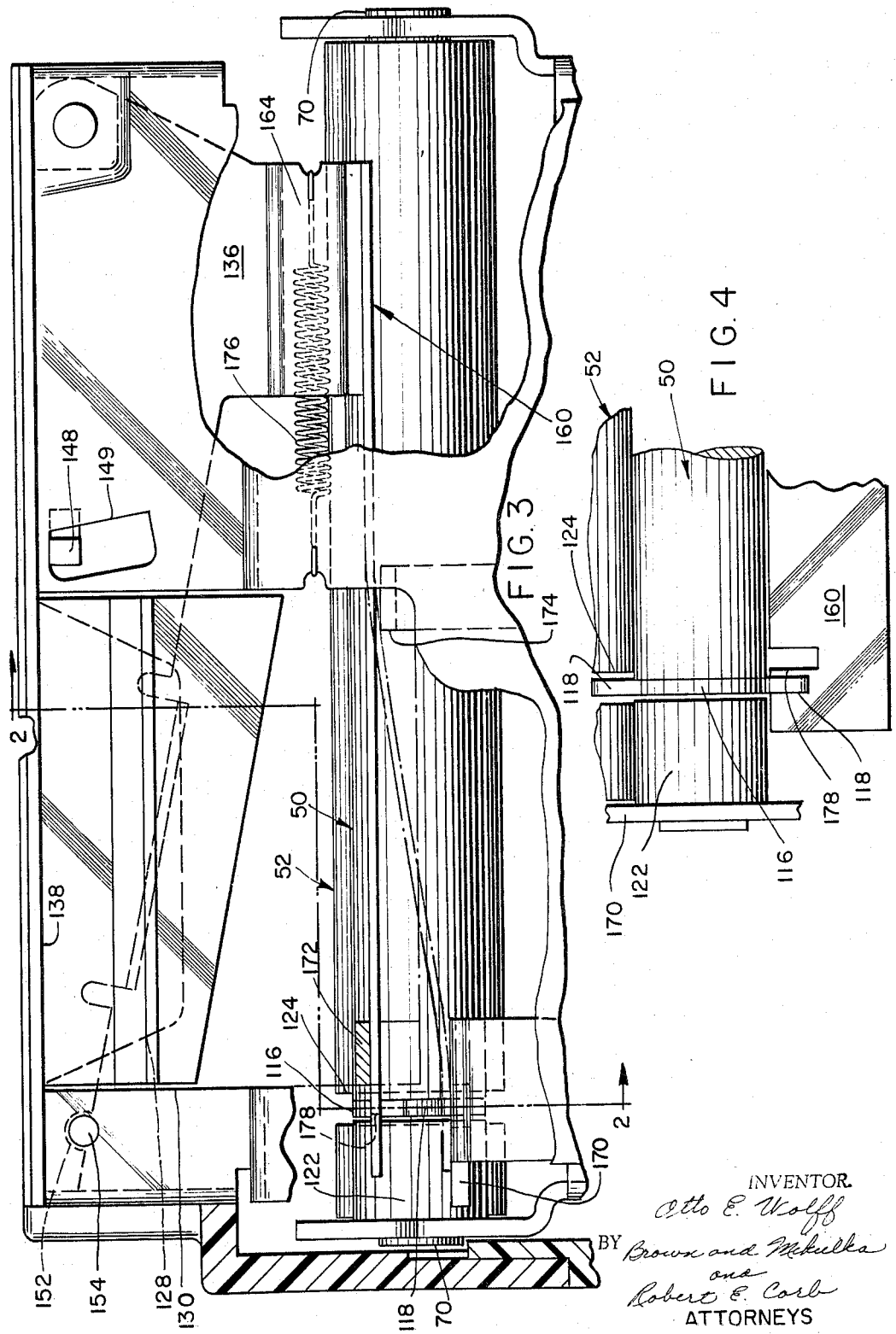

United States Patent Office 3,289,559
Patented Dec. 6, 1966

3,289,559
CAMERA INDEXING MECHANISM
Otto E. Wolff, Wayland, Mass., assignor to Polaroid Corporation, Cambridge, Mass., a corporation of Delaware
Filed Nov. 5, 1964, Ser. No. 409,070
5 Claims. (Cl. 95—13)

This invention relates to cameras for exposing successive areas of a photosensitive sheet and processing the exposed areas by superposing them with areas of a second sheet and distributing a liquid processing composition between the sheets to form a sandwich which is withdrawn, as it is formed, directly from the camera; and more particularly, to novel and improved indexing mechanisms for controlling the movement of the sheets through and from the camera.

In the copending U.S. patent applications of Vaito K. Eloranta, Serial No. 409,248, filed Nov. 5, 1964, and Richard R. Wareham, Serial No. 409,069, filed Nov. 5, 1964, there is shown and described a camera of the self-developing type including a two section housing for holding and enclosing a roll film assembly comprising an elongated photosensitive image-recording sheet coupled at its leading end with a second or image-receiving sheet and a plurality of rupturable containers of processing liquid mounted on the second sheet; means for locating for exposure and exposing successive areas of the photosensitive sheet; a pair of juxtaposed pressure-applying members for superposing each exposed area of the image-recording sheet with an area of the second sheet and distributing the processing liquid from one of the containers between the areas of the sheets to form a sandwich; an opening adjacent the pressure-applying members through which the sandwich is withdrawn directly from between the pressure-applying members; and means for preventing admission of light into the camera through the sheet withdrawal opening, severing successive portions of the sheets withdrawn from the camera through the opening and controlling movement of the sheets through and from the camera. The sheet-severing means cooperate with sheet-engagement means for controlling movement of the sheets through the camera and are so constructed and arranged as to be operated manually as a necessary part of the process of manual withdrawal of the sheets.

An object of the invention is to provide in a self-developing camera of the type described, a novel and improved sheet-severing and indexing mechanism including a sheet-engaging member movable by and in engagement with a sheet, sheet-severing means and a stop member movable into and from the path of movement of a portion of the sheet-engaging member to prevent motion of the engaging member in engagement with a sheet.

As noted in the aforementioned copending applications, the sheet-severing means include a member which must necessarily be moved, in order to engage and advance the sheets, from a cutting position to a release position at which the stop member is located out of the path of movement of the sheet-engaging member and the sheets are free to move. However, if the sheet-severing member should for any reason be retained in its release position, movement of the sheets will not be arrested. For this reason, the invention has as another object the provision of an indexing mechanism as described including a stop member adapted to be moved from an arresting position in engagement with a portion of the sheet-engaging member, out of engagement with the portion of the sheet-engaging member into a release position for engaging another portion of the sheet-engaging member and arresting movement thereof.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a partial sectional view of the camera, the section being taken substantially along the line 3—3 of FIG. 2;

FIG. 4 is a fragmentary plan view illustrating the operation of the camera; and

Figure 1:
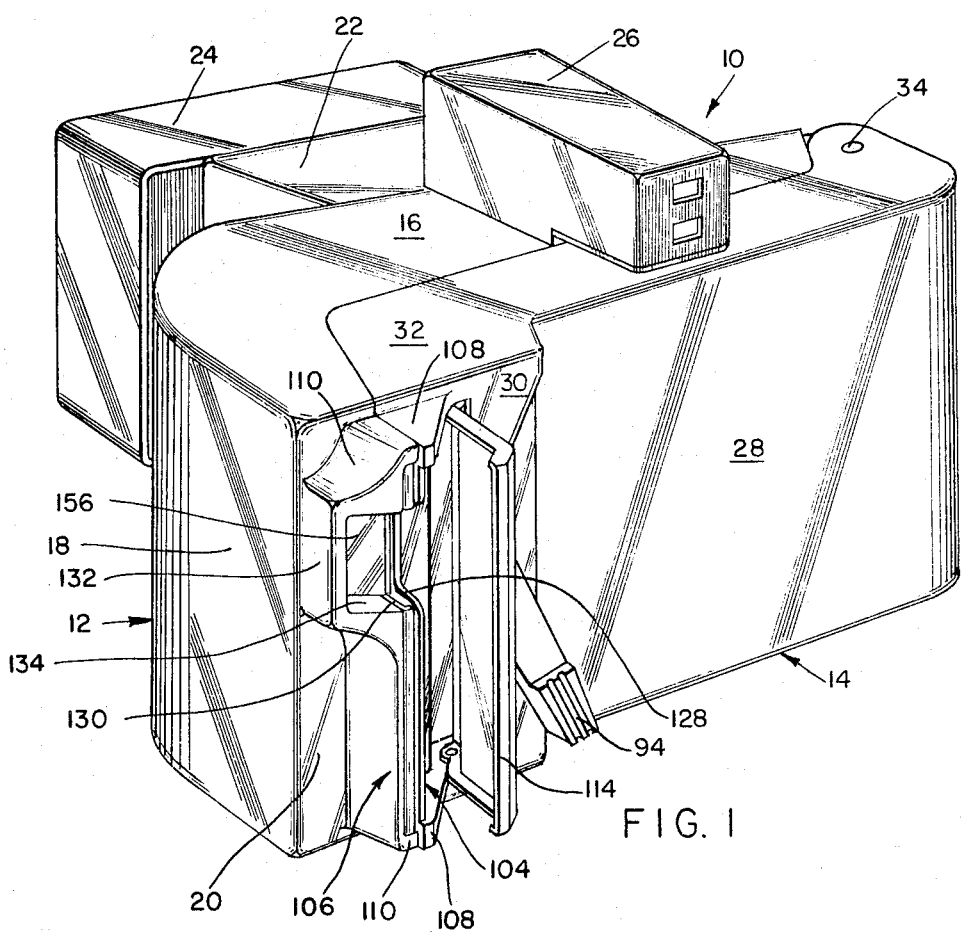
FIGURE 1 is a rear perspective view of a camera embodying the invention.
Figure 2:
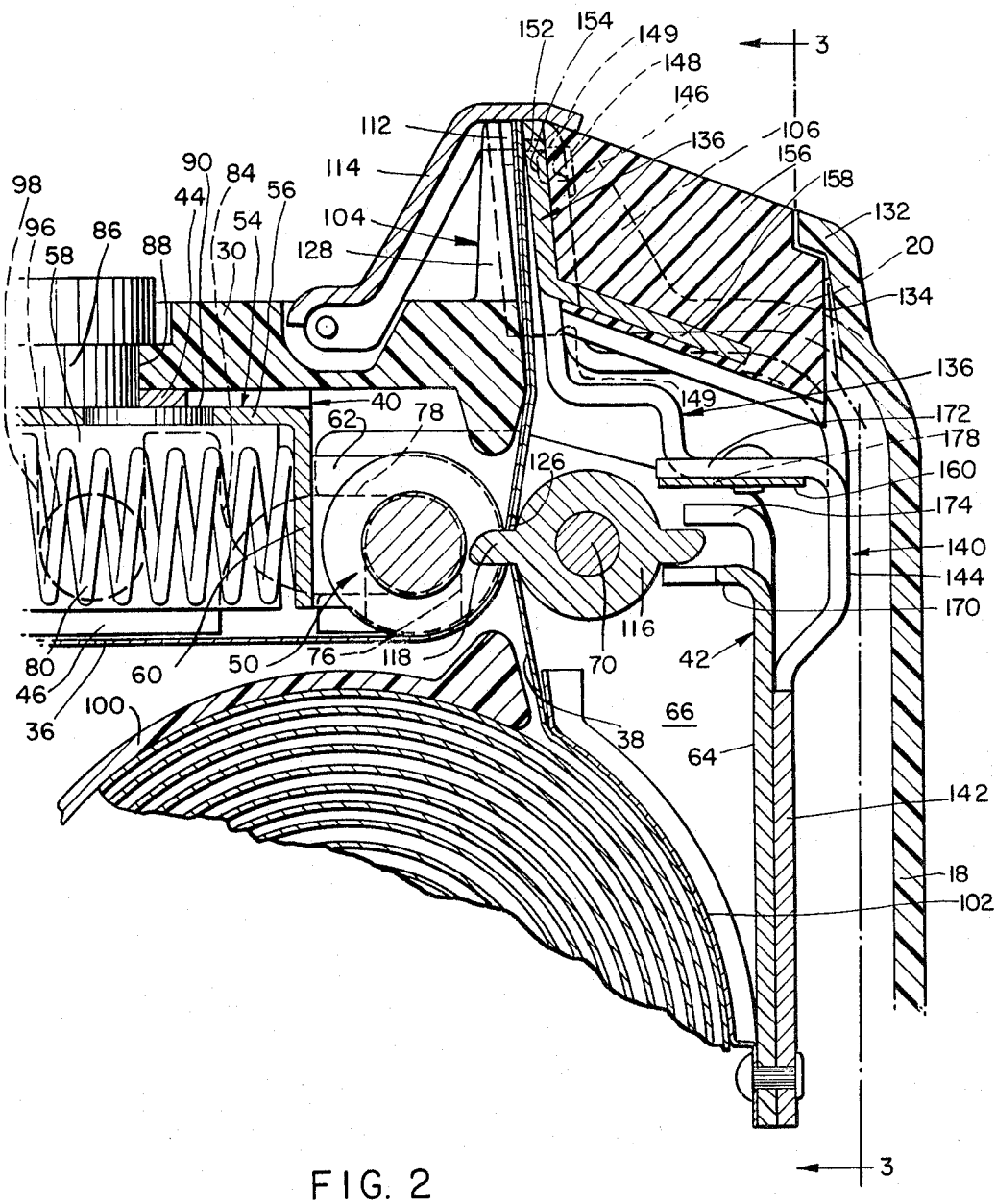
FIG. 2 is a partial sectional view of the camera of FIGURE 1, the section being taken substantially along the line 2—2 of FIG. 3.

Reference is now made to FIGS. 1 through 3 of the drawings wherein there is shown a camera 10 of the type described in the afore-mentioned application Serial No. 409,248 embodying the present invention. Camera 10 comprises a housing including a forward section 12 and a rear section 14 pivotally connected to one another for movement between the closed or operative position, shown in FIGURE 1, and in open position to permit loading of a film assemblage into the housing. Forward housing section 12 includes a main body portion comprising an upper wall 16, an end wall 18, a relatively short rear wall 20, and a lower wall, a forward wall and a wall at its opposite end, which do not show in the drawings. Extending from the main portion of the forward housing section is an extension section 22 on which is mounted a conventional lens and shutter assembly 24. A viewfinder 26 is mounted on upper wall 16.

Rear housing section 14 includes a rear wall having a first panel 28 and a rearwardly displaced second panel 30, an upper wall 32, and a lower and end walls which do not appear in the drawings. The upper and lower walls of the rear housing section overlap, respectively, portions of the upper and lower walls of the forward housing section and the rear housing section is mounted on the forward housing section, for pivotal movement about studs 34 extending from the upper and lower walls of the forward housing section and engaged in openings in the upper and lower walls of the rear housing section. The forward and rear sections of the camera housing are designed to be fabricated by mass production methods from inexpensive materials, for example, molded organic plastics.

The camera housing includes means for holding a supply of an elongated photosensitive image-recording sheet 36, supporting successive areas of the image-recording sheet in position for exposure, holding a coil of a second or image-receiving sheet 38 and guiding exposed areas of the image-recording sheet into superposition with areas of the image-receiving sheet.

Figure 5:
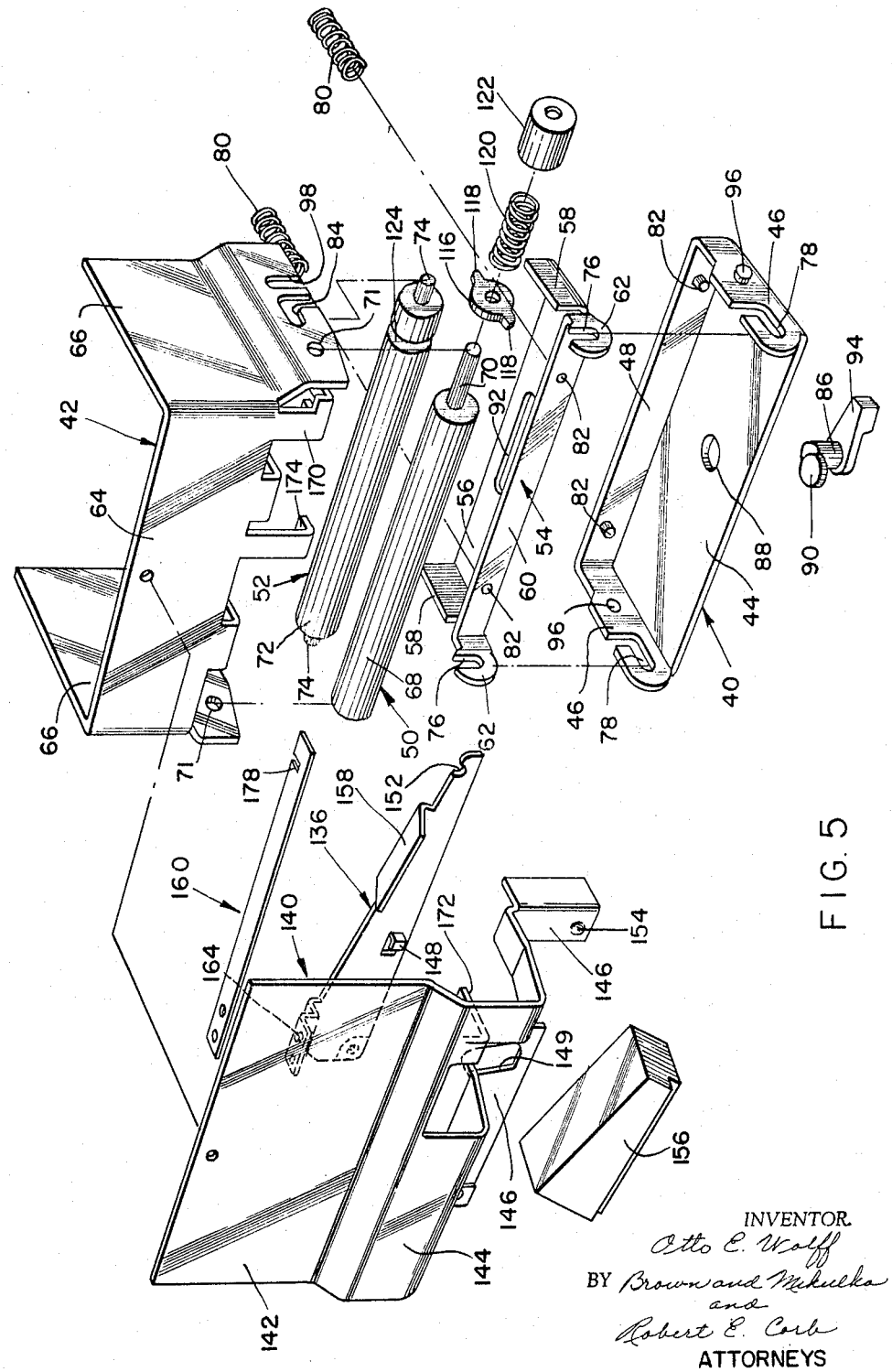
FIG. 5 is an exploded perspective view showing components of the camera.

The mechanism of the camera includes a unitary device for superposing areas of the two sheets and distributing a processing liquid between the superposed areas to form a sandwich; arresting movement of the sheets through the camera; and retaining the forward and rear housing sections in closed or operative position, as shown in FIGURE 1. This unitary device is shown in detail in FIG. 5, and comprises a first frame 40 mounted on the inside of second panel 30 of the rear wall of the rear housing section and a second frame 42 mounted within the forward housing section adjacent end wall 18 thereof. The first and second frames are preferably formed of sheet metal and function to support the processing, sheet arresting and retaining (latch) means of the camera. These last-mentioned means include components located on opposite sides of the sheets and acting in combination and in opposition to one another upon the sheets located between them and the housing sections to which they are secured. To facilitate loading and threading of the sheets into the apparatus, components of the processing and arresting mechanisms which act upon the sheets in opposition to one another are mounted on different sections of the camera housing and are required to be located with respect to one another with greater accuracy than is obtainable in a two-section camera housing formed of organic plastic materials by molding processes; and the forces exerted by and upon the components of these mechanisms are substantially greater than an inexpensive molded plastic housing is able to withstand. It is for these reasons that the processing, arresting and latch means are combined in a unitary device including two sections mounted on frames 40 and 42 which are separable by pivoting housing sections 12 and 14 with respect to one another, and which may be joined to one another to operatively locate the various components with the requisite accuracy and in a unitary device which prevents undue stresses from being applied to the camera housing.

Frame 40 includes a base 44, upstanding side members 46 and an upstanding transverse member 48 extending between and connecting side members 46; and is mounted with base 44 against the rear wall of the rear housing section with side members 46 located adjacent the upper and lower walls of the rear housing sections. The processing mechanism of the camera, that is, the means for superposing the sheets and distributing the processing liquid therebetween, comprises a pair of juxtaposed pressure-applying rolls 50 and 52 mounted, respectively, on first and second frames 40 and 42 and located in juxtaposition, as shown in FIG. 2, when the housing sections are in closed position. The means for mounting roll 50 on first frame 40 and biasing the roll toward roll 52 include a carrier 54, in turn mounted on frame 40, and including an elongated base 56 with upstanding end members 58 at its ends, a transverse member 60 upstanding from one longitudinal edge of base 56 and brackets 62 extending from the ends of transverse member 60 in opposite directions from end members 58 and in planes substantially parallel therewith. Second frame member 42 is generally U-shaped and includes a transverse member 64 located adjacent end wall 18 of the forward housing section and a pair of side members 66 located adjacent the upper and lower walls of the forward housing section. Roll 52 includes a generally cylindrical medial portion 68 and shafts 70 extending from its ends journaled in holes 71 in side members 66.

Roll 50 includes a generally cylindrical medial portion 72 cooperating with medial portion 68 of roll 52 for engaging and applying compressive pressure to the medial portions of the sheets and shafts 74 at its ends on which the roll is mounted for rotation on carrier 54 and frame 40. Shafts 74 are journaled in slots 76 in brackets 62, the slots being open at their forward ends to permit assembly of the mechanism; and in L-shaped slots 78 in side members 46 of frame 40. L-shaped slots 78 are open at their forward ends and extend rearwardly and then at right angles toward the end of the camera housing and roll 52, thereby providing for limited movement of roll 50 toward and away from roll 52 with the axes of the rolls lying in substantially the same plane. Carrier 54 is engaged between side members 46 of frame 40 for sliding movement together with roll 50 toward and away from roll 52 and is biased by springs 80 engaged between transverse member 48 of frame 40 and transverse member 64 of frame 42 around studs 82 on the transverse members. Engagement of shafts 74 in L-shaped slots 78, specifically the portions of the slots extending parallel with the direction of movement of carrier 54 with respect to frame 40, is effective to retain frame 40, carrier 54, roll 50 and springs 80 together as a unitary assembly which is mounted on the rear housing section adjacent second panel 30 thereof.

Side members 66 of frame 42 extend rearwardly in the closed position of the camera housing sections outside of side members 46 of frame 40 and include L-shaped slots 84 opening rearwardly in alignment with L-shaped slots 78 and having end portions overlying the end portions of slots 78 in the closed position of the camera housing sections. L-shaped slots 84 and side members 66 comprise components of a latching mechanism for releasably retaining the housing sections in closed position and including a shaft 86 extending from the outside of the camera housing, engaged for rotation in a hole 88 in base 44 of frame 40 and having mounted on its inner end a cam 90 engaged for rotation in an elongated hole 92 in base 56 of carrier 54. A manually engageable lever 94 is attached to the outer end of shaft 86 for rotating the cam to move carrier 54 relative to frame 40 and roll 52 against the bias of springs 80. In this manner, shafts 74 of roll 50 may be moved toward and away from roll 52 within the confines of the end portions of L-shaped slots 78 of frame 40. In the open or inoperative position of the camera, shaft 86 and cam 90 are rotated so that roll 50 and carrier 54 are displaced against the bias of springs 80 toward transverse member 48 of frame 40. In this position of roll 50, shafts 74 are aligned with the open ends of L-shaped slots 84 in side members 66 of frame 42 on the forward housing section and become engaged in L-shaped slots 84 when the rear housing section is pivoted with respect to the forward housing section into closed position. Shaft 86 and cam 90 are then rotated to allow carrier 54 and roll 50 to move under the bias of springs 80 toward roll 52 so that shafts 74 become engaged within the dead end portions of L-shaped slots 84, effectively retaining the camera housing sections in closed position.

Means are provided for properly locating frame 40 and its associated carrier 54 and roll 50 mounted thereon with respect to frame 42 and roll 52 and for absorbing the forces exerted on frames 40 and 42 by way of rolls 50 and 52, so that the forces exerted by and upon the rolls are not transferred to the camera housing. These means include a pair of studs 96 projecting outwardly from side members 46 for engagement in U-shaped slots 98 in side members 66 of frame 42 when the housing sections are in closed position. A coil of second sheet 38 is loaded into the camera housing between side members 66 of frame 42 and retained in place by a retaining member 100 mounted for movement with respect to the forward housing section and a guide member 102 mounted on transverse member 64 of frame 42, and cooperating with the retaining member in the closed position of the camera housing sections to define an opening adjacent the bite of the rolls through which sheet 38 is movable into the bite of the rolls. Image-recording sheet 36 is loaded into a chamber provided in the opposite end of the camera housing and is threaded across the rear of the camera housing adjacent the inside of panel 28, forwardly of frame 40 and carrier 54 between the latter and retaining member 100 and around roll 50 into superposition with sheet 38 within the bite of the rolls. The film assemblage, of which sheets 36 and 38 are components, also includes a plurality of rupturable containers (not shown) mounted on sheet 38 and a leader secured to and joining the leading ends of the image-recording and second sheets and adapted to be threaded between the pressure-applying rolls when the camera is loaded.

Rear wall 20 of forward housing section 12 and panel 30 of rear housing section 14 include juxtaposed portions defining an opening aligned with the bite of rolls 50 and 52 through which the sandwich comprising sheets 36 and 38 is withdrawn directly from between the pressure-applying rolls. In accordance with the invention, the forward and rear camera housing sections are provided with means for preventing the admission of light through this opening into the interior of the camera housing and, in the form shown in FIGS. 1 through 3, these means comprise a rearwardly projecting lip 104 on panel 30 located at the end of the panel and extending from side-to-side thereof and having a length slightly in excess of the width of the sheets; and a second lip 106 extending rearwardly adjacent lip 104 from rear wall 20 of the forward housing section. Lips 104 and 106 include, respectively, end members 108 and 110 which cooperate with the lips and one another to define a narrow passage 112 extending outwardly from the camera housing through which sheets 36 and 38 can be withdrawn. Passage 112, defined by lips 104 and 106 and end members 108 and 110, is only slightly wider than the maximum thickness of the materials required to be withdrawn from the camera and is inclined and oriented so that light passing through passage 112 impinges upon and is blocked by roll 52. Sheets 36 and 38 help to prevent the admission of light through passage 112 and, being opaque to actinic light, help to prevent reflection of the light from roll 52 to other parts of the interior of the camera at which it is possible to expose image-recording sheet 36. As an added precaution against exposure of the image-recording sheet to light admitted through passage 112, a cover member 114 is provided mounted on end members 108 for pivotal movement between a closed position, shown in FIG. 2, in which the cover member extends across and closes passage 112, and an open position, shown in FIGURE 1, to one side of the passage to permit withdrawal movement of sheet materials through the passage.

An area of image-recording sheet 36, following exposure, is moved into superposition with an area of second sheet 38 between rolls 50 and 52 through passage 112 and from the camera. During this movement, a processing liquid contained in a rupturable container mounted on sheet 38 is distributed between the exposed area of the image-recording sheet and the superposed area of the second sheet, and an unexposed area of the image-recording sheet is moved into position for exposure. Accordingly, the camera includes means for arresting the movement of the sheets when the exposed and processed area of the image-recording sheet has been advanced through passage 112 from the camera and the next succeeding unexposed area of the image-recording sheet is in position for exposure. This arresting or indexing means comprises a sheet-engaging member in the form of a disc 116 having a pair of radial projections 118 mounted coaxially with roll 52 on one of shafts 70 at the end of medial portion 68 of the roll. Disc 116 is rotatable with respect to roll 52 and is biased into frictional engagement with the end of medial portion 68 by a coil spring 120 engaged around shaft 70 between disc 116 and side member 66 of frame 42. A cup 122, having an outer diameter approximately equal to the diameter of medial portion 68, is provided around spring 120 to help prevent the admission of light into the camera housing past the end of the medial portion of roll 52. The medial portion of roll 50 is provided near one end thereof with a peripheral groove 124 for accommodating radial projections 118 to allow for rotation of both rolls and disc 116, and the latter is biased into frictional engagement with the end of the medial portion of roll 52.

Image-receiving sheet 38 is provided along one edge with a succession of openings 126, each opening being associated with an area of the image-receiving sheet adapted to be superposed with an exposed area of the image-recording sheet during processing thereof. Openings 126, in the image-receiving sheet, are aligned with disc 116 during movement of the sheets between the rolls and frictional coupling between roll 52 and the disc is such that one of projections 118 rides against the outer surface of sheet 38 until an opening 126 becomes aligned with the projection and the projection enters the opening and is engaged by the trailing edge of the opening, which continues to rotate the disc slightly causing the projection to punch a hole in the underlying portion of sheet 36 and enter groove 124 in roll 50. Movement of the sheets is arrested by arresting rotation of disc 116 with a projection 118 engaged in an opening 126 in sheet 38 and the hole punched in sheet 36. Movement of the sheets is recommenced by again permitting disc 116 to rotate as the sheets are withdrawn between the rolls, whereupon disc 116 again rotates (in a clockwise direction viewing FIG. 2), due to frictional coupling with roll 52, until a projection 118 comes to bear against sheet 38 and movement of the sheets is continued with the projection bearing against sheet 38 until an opening 126 becomes aligned with the projection, the projection enters the opening and is carried into the bite of the rolls, punching a hole in sheet 36 to the position shown in FIG. 2, in which movement of the sheets is arrested by arresting rotation of disc 116.

In order to permit portions of the sheets located between lips 104 and 106 to be grasped manually for withdrawing the sheets from the camera through passage 112, the lips are formed with generally aligned indentations. These include an indentation 128 in lip 104 and an indentation 130 in lip 106 defined by a reentrant section 132 of lip 106 providing a recess 134. Following withdrawal of a portion of the sandwich comprising an exposed area of the image-recording sheet from the camera through passage 112, movement of the sandwich is arrested and the portion of the sandwich projecting beyond the edges of lips 104 and 106 is severed from the remainder of the sandwich within passage 112 along a transverse line corresponding to the edges of the lips. For this purpose, the camera is provided with a cutter bar 136 pivotally mounted at one end (furthest from the indentations) between the lips and extending within passage 112. Cutter bar 136 includes a sharpened and substantially linear edge portion 138 extending at least across indentations 128 and 130 substantially in alignment with the edge of lip 104. Cutter bar 136 is mounted on a support 140 in the form of a pressed metal member having a base section 142 secured to transverse member 64, a first support section 144 shaped to conform generally to end wall 18 and rear wall 20, and a second support section 146 extending rearwardly within passage 112 closely adjacent lip 106. First and second support sections 144 and 146 are provided with an indentation 150 corresponding to indentations 128 and 130 in the lips. Cutter bar 136 is pivotally mounted on second support section 146 in face-to-face relation with the second section with the rearmost edge of the cutter bar generally aligned with the rearmost edges of the lips and second support section 146. The cutter bar is formed with a tab 148 which extends into and cooperates with an opening 149 in support section 146 to provide a stop against which the cutter bar is outwardly biased, and a limit stop for inward pivotal movement. Edge portion 138 of the cutter bar presents a single continuous sharpened member extending from end to end of passage 112 and at least equal in length to the width of the sandwich, against which the sandwich is drawn to sever it along a predetermined transverse line.

Means are provided for retaining the cutter bar in the cutting position shown in FIGS. 2 and 3 as the sandwich is drawn against the cutter bar to sever the sandwich and, in the form shown, these means comprise a notch 152 in the inner or forward edge portion of cutter bar 136 and a short detent or stud 154 on second support section 146, which extends into notch 152 and restrains the cutter bar against movement. Stud 154 is relatively short, has a rearwardly inclined cam surface, and can be disengaged from notch 152 in the cutter bar by displacing the cutter bar slightly toward lip 104. This is made possible by the fact that the cutter bar may be subject to slight bending and the pivot for the cutter bar has some play in it; however, during severance of the sandwich, the cutter bar is, of course, pressed toward second support section 146 so that stud 154 is effectively retained in notch 152. In order to manually grasp a portion of the sandwich located within passage 112 between indentations 128 and 130, cutter bar 136 must be displaced forwardly or inwardly, as shown in FIGS. 1 and 3. To facilitate this displacement by pivoting of the cutter bar, a manually engageable button 156 is provided mounted on a lug 158 formed from a portion of the cutter bar. Button 156 is mounted within recess 134 and includes an inclined rear surface which, when engaged by the thumb or one of the fingers of the operator, acts as a cam surface displacing the cutter bar both inwardly and toward lip 104 so that stud 154 is disengaged from notch 152 permitting the inward or forward motion of the button and cutter bar.

In accordance with the invention the cutter bar, which must be depressed inwardly in order to grasp the sandwich to withdraw it from the camera, also functions to control the operation of the indexing mechanism which arrests the movement of the sandwich. Movement of the sandwich is arrested by arresting rotation of disc 116 and this is accomplished by a resilient stop member in the form of elongated generally flat cantilever spring 160 secured at one end to a bracket 164 formed near the end of the cutter bar at which the cutter bar is pivotally mounted, extending in a direction generally parallel with the cutter bar and the pivotal axis of disc 116 toward the disc and including an end portion intersecting the circular path of movement of radial projections 118. A portion of transverse member 64 of second frame 42 is bent toward the rolls to form a U-shaped support member 170 having portions located adjacent opposite sides of the circular path of movement of projections 118 and adjacent the forward side of the free end portion of spring 160. A similar support member 172 is formed from a portion of support 140 and is disposed in juxtaposition with member 170 adjacent the rear side of the free end portion of spring 160. Support members 170 and 172 are spaced apart from one another to permit limited movement of the end portion of spring 160 in a direction generally tangent to the direction of rotation of radial projections 118, and lengthwise movement of the end portions of spring 160 in a direction generally parallel with the axis of rotation of disc 116 into and from the path of rotation of radial projections 118. In FIG. 3, the cutter bar is shown in its operative or cutting position, and spring 160 is shown in position to engage one of projections 118 and arrest the rotation of disc 116 in engagement with the sheets. Support member 170 functions to support spring 160 against motion when engaged with a projection 118 while member 172 limits movement of the free end portion of spring 160 in the opposite direction. Spring 160 is substantially straight and its free end is supported against member 172 in position to engage a radial projection, by a support member 184 formed from a portion of connecting member 64 of frame 42 and located to bear against the medial portion of spring 160. As a means for biasing the cutter bar into its operative position shown in FIG. 3, a tension spring 176 is provided coupled at its ends between bracket 164 and support section 144.

The free end portion of spring 160 is formed with a recess or notch 178 shaped to provide clearance for radial projections 118. When spring 160 is in its normal position in readiness to engage a radial projection 118 to arrest the rotation of disc 116 and movement of the sheets, it is in the position shown in FIG. 3 with the free end portion of the spring bearing against support member 172 and notch 178 located to one side (the left viewing FIGS. 3 and 4) of the path of movement of radial projections 118. As disc 116 is rotated due to engagement of a projection 118 with the sheets, the other projection 118 moves into engagement with the free end portion of spring 160 deflecting the spring to the position shown in broken lines in FIG. 3, with the free end portion of the spring bearing against support member 170 which functions to prevent further deflection of the spring and arrest rotation of disc 116. To resume advancement of the sandwich, button 156 and cutter bar 136, to which it is attached, are depressed inwardly toward the front of the camera to permit the operator to grasp the sandwich, and this rotation of the cutter bar in a counterclockwise direction displaces spring 160 lengthwise (to the right) bringing notch 178 into alignment with the projection 118 engaged by the spring thereby permitting the spring to return to a position against support member 172 behind the radial projection leaving disc 116 free to rotate at least sufficiently to permit the continued advancement of the sandwich.

The sheet arresting or indexing mechanism of the invention includes a safety feature not present in indexing mechanisms of the type described in the aforementioned applications in which the stop member, i.e., spring 160, is merely withdrawn from the path of movement of projections 118 by depression of the cutter bar. This safety feature provides for the possibility of the cutter bar not being released to return to its normal position during the initial and continued advancement of the sheet with the result that the stop member of the device described heretofore remains out of the path of movement of the sheets as long as the cutter bar remains depressed inwardly and movement of the sheets cannot be arrested. In the apparatus of the invention, the lengthwise movement of spring 160, due to inward depression of the cutter bar, is continued until notch 178 is located to the opposite side of the path of movement of projections 118 and the end section of spring 160 is located in the path of movement of the radial projections. Thus, with this construction, one of the pair of radial projections is disengaged by depression of the cutter bar permitting rotation of disc 116 sufficiently to permit advancement of the sheets and a portion of the cutter bar is positioned for engaging the other radial projection and arresting movement of the sheets at the proper position even though the cutter bar may remain in its depressed or released position. In the normal operation of the camera, when the sandwich is withdrawn, the cutter bar returns to its original position returning spring 160 to its normal position, shown in FIG. 3, behind the radial projection previously engaged.

The invention described herein provides a camera structure and operating mechanism which close an opening in the camera against the admission of light during withdrawal of sheet materials through the opening, provide means for severing successive portions of the sheet materials as they are withdrawn from the opening, provide an indexing mechanism for arresting movement of sheet materials at predetermined positions, and automatically release the sheet material for movement when the sheets are grasped and withdrawn from the camera. This release operation is termed "automatic" because the construction of the camera and operating mechanism is such that the sheets cannot be grasped and withdrawn without releasing the sheets for movement, that is, releasing the sheet engagement disc for rotation; and in this way tearing of the sheets is prevented because the operator does not have to remember to release the arresting mechanism. Moreover, the operating mechanism is so designed and constructed that it is virtually impossible for even the deliberate act of the operator, e.g., holding the cutter bar depressed while withdrawing the sandwich, to cause the mechanism to malfunction.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including a rotatable pressure-applying member for distributing a processing liquid in contact with a photographic sheet during movement of said sheet relative to and in engagement with said pressure-applying member, an engagement member mounted coaxially with said pressure-applying member for rotation in response to rotation of said pressure-applying member, said engagement member including a plurality of radial projections for engaging successive engageable portions of said sheet to arrest movement of said sheet and a manually engageable control member adapted to be moved from a first position to a second position prior to commencement of movement of said sheet and from said second position to said first position during initial movement of said sheet, the combination therewith of means for controlling rotation of said engagement member comprising:

an elongated resilient stop member coupled with said control member and including an end section extending in a direction generally parallel with the axis of rotation of said pressure-applying member and engagement member into the circular path of rotation of said projections;

support means including support members located adjacent said path of rotation of said radial projections on opposite sides of said end section in position to allow lengthwise motion of said stop member and predeterminedly limit transverse motion of said end section in a direction tangential to said circular path of rotation;

said control member being engaged with said stop member for moving said end section of said stop member lengthwise between said support members in said path of rotation in response to movement of said control member between said first and second positions thereof; and resilient means for biasing said control member into said first position;

said end section of said stop member being biased in a direction opposite to the direction of rotation of said radial projections and including a first portion disposed in said path of rotation at said first position of said control member, a second portion disposed in said path of rotation at said second position of said control member and an intermediate portion connecting said first and second portions and located to one side of said circular path of rotation of said projections whereby said end section is disengaged from one of said projections during movement of said control member between said first and second positions.

2. The photographic apparatus of claim 1 wherein said end section of said stop member is in the form of a strip, said first and second portions comprise an edge portion of said strip movable lengthwise in said circular path of rotation of said projections and said edge portion is formed with a notch between said first and second portions providing clearance for said radial projections.

3. The photographic apparatus of claim 1 wherein said stop member comprises a cantilever spring mounted on said first control member and said end section of said stop member is the free end portion of said cantilever spring.

4. The photographic apparatus of claim 3 wherein said end portion of said spring includes a generally straight edge portion movable lengthwise in said circular path of rotation of said projections and said edge portion is formed with a notch providing clearance for said radial projections.

5. The photographic apparatus of claim 4 in which said notch has a width exceeding only slightly the axial widths of said projections.

References Cited by the Examiner
UNITED STATES PATENTS 2,935,004    5/1960    Eburn _____ 95—13

JOHN M. HORAN, *Primary Examiner.*